(12) United States Patent
Sun et al.

(10) Patent No.: US 12,172,724 B2
(45) Date of Patent: Dec. 24, 2024

(54) STEERING KNUCKLE AND STEERING MECHANISM

(71) Applicant: CONTEMPORARY AMPEREX TECHNOLOGY (HONG KONG) LIMITED, Hong Kong (CN)

(72) Inventors: Changxing Sun, Ningde (CN); Xiaowei Yu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/592,097

(22) Filed: Feb. 29, 2024

(65) Prior Publication Data

US 2024/0199118 A1 Jun. 20, 2024

Related U.S. Application Data

(63) Continuation of application No. PCT/CN2022/128438, filed on Oct. 28, 2022.

(30) Foreign Application Priority Data

Nov. 22, 2021 (CN) .......................... 202122871983.4

(51) Int. Cl.
*B62D 7/18* (2006.01)
*B62D 7/20* (2006.01)

(52) U.S. Cl.
CPC .................... *B62D 7/18* (2013.01); *B62D 7/20* (2013.01)

(58) Field of Classification Search
CPC .................... B62D 7/18; B62D 7/20
See application file for complete search history.

(56) References Cited

U.S. PATENT DOCUMENTS

| | | | | |
|---|---|---|---|---|
| 3,574,371 A | * | 4/1971 | Kindel .................. | B60G 7/005 403/140 |
| 5,199,730 A | * | 4/1993 | Westfall .................. | B62D 7/18 280/93.512 |

(Continued)

FOREIGN PATENT DOCUMENTS

| | | |
|---|---|---|
| CN | 104210547 A | 12/2014 |
| CN | 104210548 A | 12/2014 |

(Continued)

OTHER PUBLICATIONS

The World Intellectual Property Organization (WIPO) International Search Report for PCT/CN2022/128438 Dec. 14, 2022 8 Pages (including translation).

*Primary Examiner* — Faye M Fleming
(74) *Attorney, Agent, or Firm* — ANOVA LAW GROUP, PLLC

(57) ABSTRACT

A steering knuckle includes a housing and an extension arm. One end of the extension arm is disposed on the housing on a side corresponding to a position of a rear wheel. A first assembly hole configured to fit a ball joint tie rod is created at another end of the extension arm. The housing includes a bottom face as well as a first end face and a second end face disposed opposite to each other on the bottom face. A second assembly hole configured to fit a ball joint lower control arm is created on the first end face. A third assembly hole configured to fit a ball joint upper control arm assembly is created on the second end face. A connecting line between the second assembly hole and the third assembly hole forms a kingpin axis.

10 Claims, 2 Drawing Sheets

(56) References Cited

U.S. PATENT DOCUMENTS

| | | | | |
|---|---|---|---|---|
| 10,414,224 | B2* | 9/2019 | Neu | B62D 7/20 |
| 11,247,523 | B2* | 2/2022 | Hammer | B60G 3/20 |
| 11,352,056 | B2* | 6/2022 | Moon | B60G 7/005 |
| 12,017,499 | B2* | 6/2024 | Joo | B60G 3/20 |
| 2007/0187917 | A1* | 8/2007 | Hasegawa | B60G 7/008 |
| | | | | 280/93.502 |
| 2021/0339799 | A1* | 11/2021 | Tonini | B62D 15/023 |
| 2022/0250430 | A1* | 8/2022 | Kolp | B60G 7/02 |

FOREIGN PATENT DOCUMENTS

| | | |
|---|---|---|
| CN | 204020979 U | 12/2014 |
| CN | 107627801 A | 1/2018 |
| CN | 207141173 U | 3/2018 |
| CN | 108068883 A | 5/2018 |
| CN | 209814091 U | 12/2019 |
| CN | 210126554 U | 3/2020 |
| CN | 111284559 A | 6/2020 |
| CN | 216401548 U | 4/2022 |
| KR | 100779351 B1 | 11/2007 |

\* cited by examiner

STEERING KNUCKLE AND STEERING MECHANISM

CROSS-REFERENCE TO RELATED APPLICATIONS

This application is a continuation of International Application No. PCT/CN2022/128438, filed on Oct. 28, 2022, which claims priority to Chinese Patent Application No. 202122871983.4, filed on Nov. 22, 2021 and entitled "STEERING KNUCKLE AND STEERING MECHANISM", the entire contents of both of which are incorporated herein by reference.

TECHNICAL FIELD

This application relates to the technical field of automotive parts, and in particular, to a steering knuckle and a steering mechanism.

BACKGROUND

The design of a steering knuckle on an existing vehicle meets the need of articulating all rod systems of a rear suspension of the vehicle, but is unable to fulfill an articulation function required for mounting a rear wheel steering mechanism, thereby resulting in problems that a rear wheel steering angle of the vehicle is overly small and a steering radius of the vehicle is large.

TECHNICAL PROBLEMS

The design of a steering knuckle on an existing vehicle meets the need of articulating all rod systems of a rear suspension of the vehicle, but is unable to fulfill an articulation function required for mounting a rear wheel steering mechanism, thereby resulting in problems that a rear wheel steering angle of the vehicle is overly small and a steering radius of the vehicle is relatively large.

TECHNICAL SOLUTIONS

To achieve the above objective, a technical solution put forward herein is: a first aspect of this application provides a steering knuckle, including a housing and an extension arm. One end of the extension arm is disposed on the housing on a side corresponding to a position of a rear wheel. A first assembly hole configured to fit a ball joint tie rod is created at another end of the extension arm.

The housing includes a bottom face as well as a first end face and a second end face disposed opposite to each other on the bottom face. A second assembly hole configured to fit a ball joint lower control arm is created on the first end face. A third assembly hole configured to fit a ball joint upper control arm assembly is created on the second end face. A connecting line between the second assembly hole and the third assembly hole forms a kingpin axis.

In an embodiment, a gouge is created on the extension arm, thereby reducing the weight while ensuring sufficient strength of the extension arm.

In an embodiment, the housing and the extension arm are formed in one piece. The steering knuckle formed in one piece is of higher strength and easy to process, and can effectively reduce the production cost.

In an embodiment, a reinforcing rib is disposed in the housing. One end of the reinforcing rib is connected to the bottom face of the housing, and another end of the reinforcing rib abuts on a lateral face of the housing. The reinforcing rib increases the strength and reliability of the corresponding parts of the steering knuckle.

In an embodiment, the reinforcing rib is located on the housing on a side close to the extension arm. In a process of steering a vehicle, the two ends of the tie rod revolve by using the first assembly holes on the two steering knuckles disposed opposite to each other as articulation points. This is a long-term and frequently recurring movement. Therefore, the reliability of the extension arm and the first assembly holes thereon needs to be ensured. The reinforcing rib located in this position can effectively increase the strength of the extension arm, and avoid bending the extension arm toward the inner side of the housing.

In an embodiment, a through-hole configured to allow passage of a wheel bearing is created on the bottom face of the housing, and a fourth assembly hole configured to connect the wheel bearing is further created outside the through-hole.

In an embodiment, the number of the fourth assembly holes is at least one. The at least one fourth assembly hole is centered around the through-hole and evenly distributed outside the through-hole, so as to facilitate production and processing and meet subsequent assembling requirements.

In an embodiment, the housing is made of aluminum. Understandably, the extension arm may also be made of aluminum. The steering knuckle made of aluminum is lighter and ensures fulfilment of the strength requirement.

In an embodiment, a fifth assembly hole configured to connect a brake caliper is further created on the housing on a side opposite to the extension arm.

A second aspect of this application provides a steering mechanism, including a tie rod, an upper control arm assembly, a lower control arm, a lower leaf spring, a damper, and the steering knuckle disclosed above. The number of steering knuckles is plural and matches the number and positions of rear wheels.

The tie rod is articulated between the first assembly holes of the two steering knuckles disposed opposite to each other.

The lower control arm includes two lower support arms. A first junction exists between the two lower support arms. The first junction is articulated to the second assembly hole. The two lower support arms are both connected to the lower leaf spring.

The upper control arm assembly includes two upper support arms, and a second junction exists between the two upper support arms. The second junction is articulated to the third assembly hole. The two upper support arms are both connected to a rear subframe.

The damper is connected between the rear subframe and the lower leaf spring.

All the articulations are ball joint articulations.

In the steering mechanism provided in this application, the steering knuckle is directly connected to the lower leaf spring through the lower control arm, thereby replacing the conventional practice of combining the lower control arm with a spring structure, reducing the unsprung mass of the suspension and improving the comfort and maneuverability of the leaf spring suspension.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BENEFICIAL EFFECTS

The steering knuckle provided in this application is configured to steer rear wheels of a vehicle. The steering knuckle includes a housing and an extension arm connected to the housing. A first assembly hole configured to connect the tie rod is created on a non-connecting end of the extension arm. In the related art, the tie rod is fixed by a bushing, and is just able to hop up and down but unable to rotate left and right. By contrast, the first assembly hole arranged in this application can additionally provide an articulation point for the tie rod, thereby increasing the degree of freedom of the tie rod during the steering. Moreover, the second assembly hole and the third assembly hole are disposed on the two opposite end faces of the housing respectively. A kingpin axis is formed between the second assembly hole and the third assembly hole. The ball joint connection manner provides more freedom for the three positions. In this way, the rear wheels can implement large-angle steering when rotating around the kingpin axis, thereby reducing the steering radius, and improving the capability of the vehicle in passing a road with a relatively small steering radius.

BRIEF DESCRIPTION OF DRAWINGS

To describe the technical solutions in some embodiments of this application more clearly, the following outlines the drawings to be used in the description of some embodiments of this application or the related art. Evidently, the drawings outlined below are merely a part of embodiments of this application. A person of ordinary skill in the art may derive other drawings from such drawings without making any creative effort.

Figure 1:
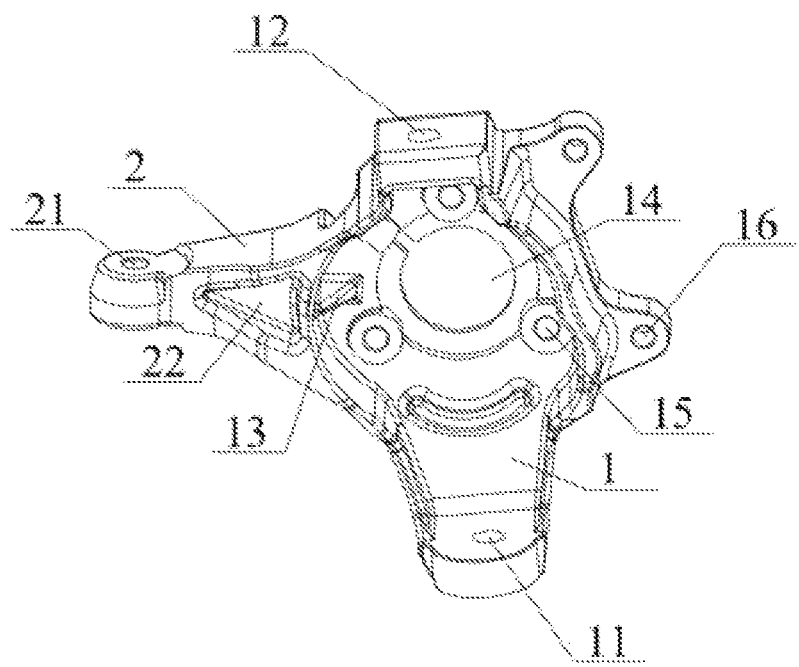
FIG. 1 is a schematic structural diagram of a steering knuckle according to an embodiment of this application.

The drawings are not necessarily drawn to scale.

LIST OF REFERENCE NUMERALS

1—housing, 11—second assembly hole, 12—third assembly hole, 13—reinforcing rib, 14—through-hole, 15—fourth assembly hole, 16—fifth assembly hole; 2—extension arm, 21—first assembly hole, 22—gouge; 3—tie rod, 4—lower control arm, 5—upper control arm assembly, 6—wheel bearing, 7—lower leaf spring, 8—damper, 9—rear subframe.

DETAILED DESCRIPTION OF EMBODIMENTS

To make the objectives, technical solutions, and advantages of the embodiments of this application clearer, the following gives a clear and complete description of the technical solutions in the embodiments of this application with reference to the drawings in the embodiments of this application. Apparently, the described embodiments are merely a part of but not all of the embodiments of this application. All other embodiments derived by a person of ordinary skill in the art based on the embodiments of this application without making any creative efforts still fall within the protection scope of this application.

It is hereby noted that a component referred to as being "fixed to" or "disposed on" another component may be directly positioned onto the other component or may be positioned onto the other component indirectly through an intermediate component. A component referred to as "connected to" another component may be directly or indirectly connected to the other component.

Understandably, a direction or positional relationship indicated by the terms such as "length", "width", "up", "down", "front", "back", "left", "right", "vertical", "horizontal", "top", "bottom", "in", and "out" is a direction or positional relationship based on the illustration in the drawings, and is merely intended for ease or brevity of description of this application, but does not necessarily mean or imply that the indicated device or component is located in the specified direction or constructed or operated in the specified direction. Therefore, such terms are not to be understood as a limitation on this application.

In addition, the technical terms such as "first" and "second" are used merely for ease of description, but not to indicate or imply relative importance or implicitly specify the number of technical features mentioned. Therefore, a feature defined with "first" or "second" may explicitly or implicitly include one or more of the features.

A vehicle often needs to change directions during travel. When the vehicle is moving along a straight line, wheels usually deflect and change the movement direction after being subjected to a lateral disturbing force on a road surface. In order to turn and re-center the steering wheel, the use of a steering mechanism, especially a steering knuckle, is involved. In the related art, due to the need of steering, the steering knuckle is more often used for front wheels of a vehicle. However, because a distance between an upper articulation point and a lower articulation point of the front wheel is large, the design differs sharply between the front wheel steering knuckle and the rear wheel steering knuckle. Therefore, the steering knuckle applied to the front wheels is not applicable to the rear wheels. During steering of a rear wheel, the tie rod between the rear wheels is mostly connected by being fixed with a bushing in the related art. Although the bushing is deformable to some extent, the bushing is essentially a soft rubber pad. The steering angle depends on the softness or hardness of the soft rubber pad. The softer the rubber pad, the larger the variable steering angle of the rear wheels, but the lower the suspension stiffness, thereby resulting in poor stability. The harder the soft rubber pad, the smaller the rear wheel steering angle, but the higher the suspension stiffness, and the higher the stability. That is because the resistance of the rubber is also very high. On the premise of satisfying the required suspension stiffness, the steering implemented by bushing fixation is relatively small and much restricts the deformation direction. Consequently, the rear wheel steering angle of the vehicle is overly small, and the steering radius of the vehicle is relatively large. In view of the above problems, this application provides a steering knuckle and a steering mechanism.

The steering knuckle and the steering mechanism provided in this application are described in detail below with reference to specific embodiments.

Figure 2:
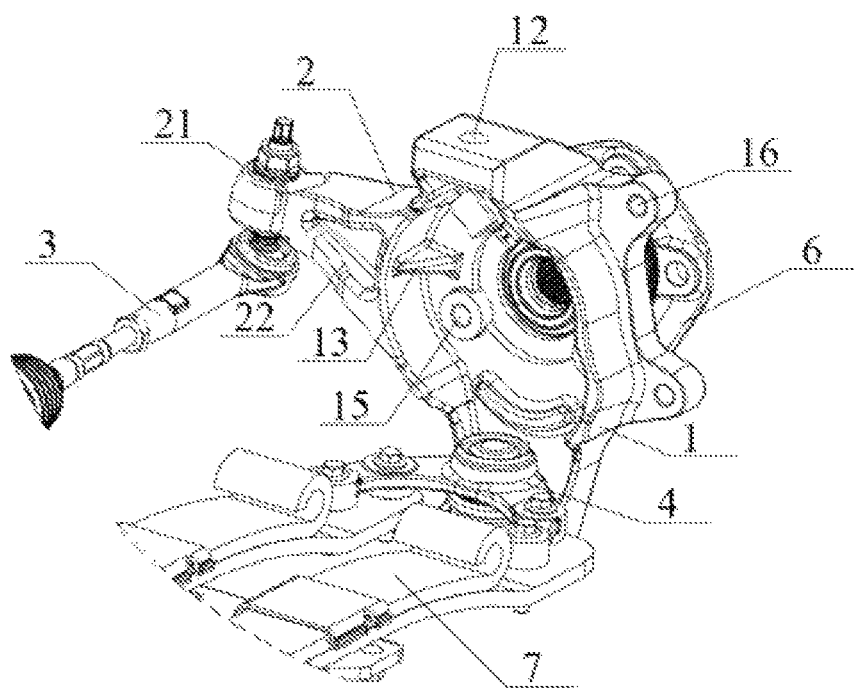
FIG. 2 is a schematic structural diagram of a steering knuckle assembled with a tie rod, a lower control arm, a lower leaf spring, and a wheel bearing according to an embodiment of this application.
Figure 3:
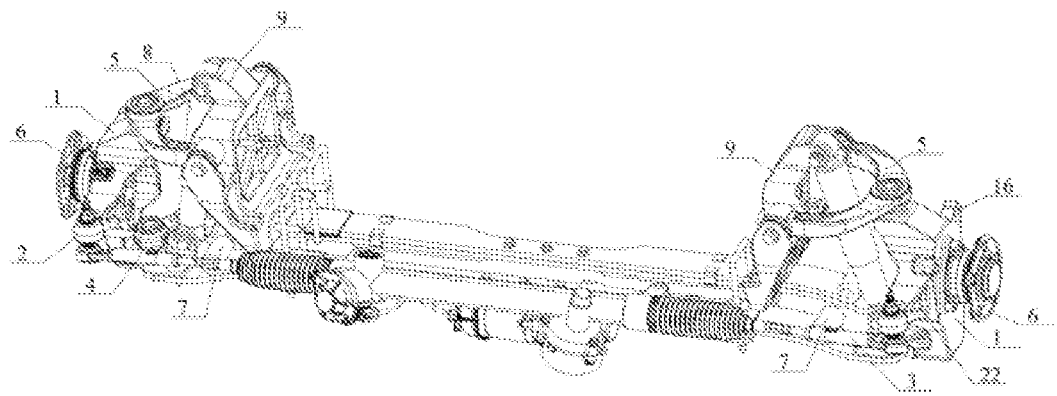
FIG. 3 is a schematic structural diagram of a steering mechanism according to an embodiment of this application.
Figure 4:
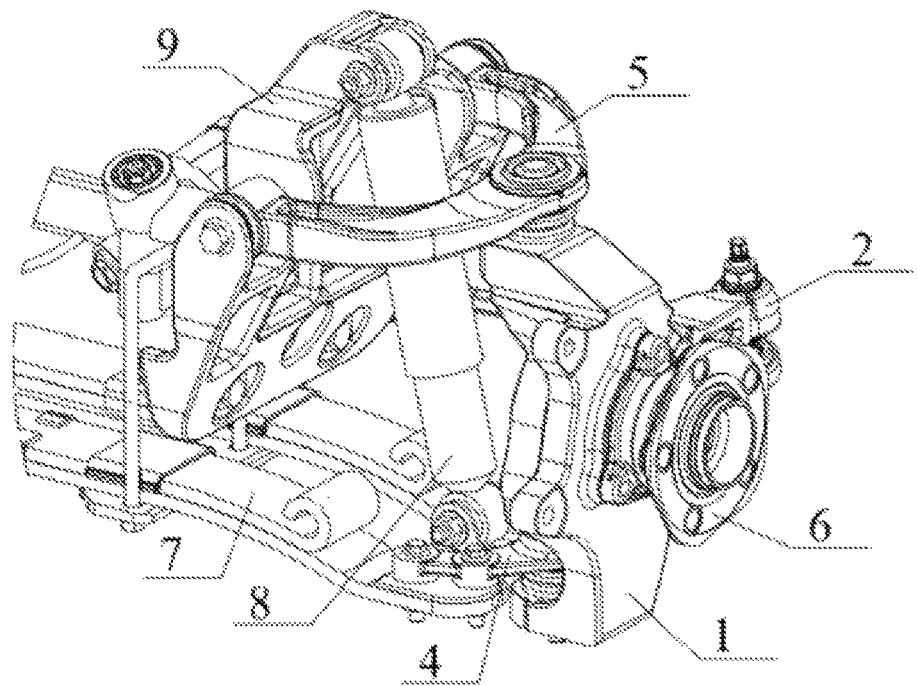
FIG. 4 is a schematic structural diagram of a (partial) steering mechanism according to an embodiment of this application.

FIG. 1 is a schematic structural diagram of a steering knuckle according to an embodiment of this application; FIG. 2 is a schematic structural diagram of a steering knuckle assembled with a tie rod, a lower control arm, a lower leaf spring, and a wheel bearing according to an embodiment of this application; FIG. 3 is a schematic structural diagram of a steering mechanism according to an embodiment of this application; and FIG. 4 is a schematic structural diagram of a (partial) steering mechanism from a viewing angle according to an embodiment of this application. Referring to FIG. 1, a first aspect of this application provides a steering knuckle, including a housing 1 and an extension arm 2. One end of the extension arm 2 is disposed on the housing 1 on a side corresponding to a position of a rear wheel. A first assembly hole 21 configured to fit a ball joint tie rod 3 is created at another end of the extension arm. The housing 1 includes a bottom face as well as a first end face and a second end face disposed opposite to each other on the bottom face. A second assembly hole 11 configured to fit a ball joint lower control arm 4 is created on the first end face. A third assembly hole 12 configured to fit a ball joint upper control arm assembly 5 is created on the second end face. A connecting line between the second assembly hole 11 and the third assembly hole 12 forms a kingpin axis. The upper control arm assembly 5 and the lower control arm 4 each may include a ball seat, and then the lower control arm 4 is articulated to the second assembly hole 11 on the housing 1 through a ball joint. The upper control arm assembly 5 is articulated to the third assembly hole 12 on the housing 1 through a ball joint.

The steering knuckle provided in this application is configured to steer rear wheels of a vehicle. The steering knuckle includes a housing 1 and an extension arm 2 connected to the housing 1. A first assembly hole 21 configured to connect the tie rod 3 is created on a non-connecting end of the extension arm 2. In the related art, the tie rod 3 is fixed by a bushing and is just able to hop up and down but unable to rotate left and right, thereby restricting the steering. By contrast, in this application, the extension arm 2 is disposed so that a greater distance is provided for the articulation point between the rear wheels, thereby increasing the space available for steering. In conjunction with the first assembly hole 21 disposed on the extension arm 2, an additional articulation point is provided for the tie rod 3, thereby increasing the degree of freedom of the tie rod 3 during the steering, and in turn, implementing a larger angle of steering. Moreover, the second assembly hole 11 and the third assembly hole 12 are disposed on the two opposite end faces of the housing 1 respectively. A kingpin axis is formed between the second assembly hole 11 and the third assembly hole 12. The ball joint connection manner provides more freedom for the three positions. In this way, the rear wheels are enabled to implement large angle of steering when rotating around the kingpin axis, thereby reducing the steering radius, and improving the capability of the vehicle in passing a road with a relatively small steering radius. Specifically, with the steering knuckle applicable to the rear wheels and adjusted through the extension arm 2 and the first assembly hole 21, the steering angle can be made more than twice as large as a general design of rear wheel steering angle, or may be even up to 20° based on the practical demand or design in a case that space is sufficient for peripherals of a tire. Alternatively, the steering knuckles that provide different steering angles and that are applicable to rear wheels may be designed based on practical requirements, without being particularly limited herein.

It is hereby noted that the rear wheel may steer in the same direction as or in an opposite direction to the front wheel. The two circumstances may exhibit two completely different types of steering characteristics. Simply put, understeering increases when the rear wheel steers in the same direction as the front wheel, and oversteering increases when the rear wheel steers in an opposite direction to the front wheel. When the vehicle is traveling at low speeds, the oversteering may be appropriately increased by rolling the rear wheel in an opposite direction to the front wheel. When a vehicle traveling at a high speed needs to change a lane emergently, oversteering is very prone to occur without the aid of any electronic assistance system. The rear wheels may deflect in the same direction as the front wheels at a very small but important angle to offset the tendency of oversteering, thereby making the vehicle more balanced. Therefore, the rear wheel steering angle is preferably not overly small, let alone overly large.

The steering knuckle in this embodiment is applicable to cars, trucks, logistics vehicles, and other types of vehicles. The type of vehicles is not particularly limited herein.

In an embodiment of this application, referring to FIG. 1, a gouge 22 is created on the extension arm 2 in the steering knuckle in this embodiment. The gouge 22 further reduces the overall weight of the steering knuckle while ensuring sufficient strength of the extension arm 2. The shape of the gouge 22 may be consistent with an outer contour of the extension arm 2 or not. The shape of the gouge 22 is not particularly limited herein. In addition, one or more gouges 22 may be created. In some embodiments, considering the required strength of the extension arm 2, the difficulty of design, and the practical processing process, one gouge 22 is created.

To ensure the overall strength of the steering knuckle and reduce the processing difficulty, in some embodiments, that the housing 1 and the extension arm 2 are formed in one piece. Alternatively, in another embodiment, the housing 1 and the extension arm 2 may be manufactured by being processed separately and then assembled together. In this case, the housing 1 or the extension arm 2 can be quickly disassembled and replaced when either one thereof is broken or damaged.

In an embodiment of this application, the housing 1 is made of aluminum. Understandably, the extension arm 2 may also be made of aluminum. The steering knuckle in the related art is usually a forged piece, and is made of steel. Such a steering knuckle is heavy in weight although meeting the strength requirement, thereby increasing the weight of the vehicle. In this embodiment of this application, the steering knuckle, which is made of an aluminum material by milling, is lighter and also ensures fulfilment of the strength requirement. In other embodiments, the steering knuckle of this application may be manufactured by other processes instead. Definitely, the housing 1 and the extension arm 2 may be made of different materials, depending on practical circumstances.

To increase the strength of the housing 1, a reinforcing rib 13 is disposed in the housing 1. One end of the reinforcing rib 13 is connected to the bottom face of the housing 1, and another end of the reinforcing rib abuts on a lateral face of the housing 1. The reinforcing rib 13 increases the strength and reliability of the corresponding parts of the steering knuckle. In some embodiments, the reinforcement 13 is positioned on the housing 1 on a side close to the extension arm 2, thereby increasing the load-bearing capacity of a connecting surface between the extension arm 2 and the housing 1. In the process of steering a vehicle, the two ends of the tie rod 3 revolve by using the first assembly holes 21 on the two steering knuckles disposed opposite to each other as articulation points. In other words, the extension arm 2 is subjected to a pressure, a torsion, and even a bending force for a long term. This is a long-term and frequently recurring movement. Therefore, the reliability of the extension arm 2 and the first assembly holes 21 thereon needs to be ensured. The reinforcing rib 13 is very suitable for products that are often subjected to a pressure, a torsion, and a bending force. Therefore, the reinforcing rib 13 located in this position can effectively increase the strength of the extension arm 2, and avoid bending the extension arm 2 toward the inner side of the housing 1, thereby reducing the number of times of maintenance for the steering knuckle and prolonging the service life of the steering knuckle. A simplest design shape of the reinforcing rib 13 is a rectangular column attached to the lateral face of the housing 1. However, in order to meet some production requirements or structural requirements, the reinforcing rib 13 may be L-shaped, H-shaped, or in other shapes. Optionally, in an embodiment, the height of the reinforcing rib 13 may occupy just a part of height of the lateral face of the housing 1, so as to locally increase the stiffness of the part of height of the lateral face of the housing 1 in relation to the extension arm 2. In another embodiment, the height of the reinforcing rib 13 may be equal to the height of the lateral face of the housing 1, so as to locally increase the stiffness of the full height of the lateral face of the housing 1 in relation to the extension arm 2. In some other embodiments, a plurality of reinforcing ribs 13 may be disposed evenly in the lateral face of the housing 1 to increase the strength of the housing 1. In some embodiments, the reinforcing rib 13 is made of the same material as the housing 1 and the extension arm 2. In some embodiments, the reinforcing rib 13 are formed together with the housing 1 and the extension arm 2 in one piece.

The steering knuckle also needs to be assembled with the wheel bearing 6. The main function of the wheel bearing 6 is to bear the weight and provide precise guidance for the rotation of the wheel hub. The wheel bearing can bear both axial loads and radial loads, and is a very important component. A part of the wheel bearing 6 passes through the steering knuckle. Therefore, a through-hole 14 configured to allow passage of the wheel bearing 6 is created on the bottom face of the housing 1. A fourth assembly hole 15 configured to connect the wheel bearing 6 is further created outside the through-hole 14. The number of the fourth assembly holes 15 is at least one. To facilitate processing and achieve a reliable and firm assembling relationship between the wheel bearing 6 and the steering knuckle, the at least one fourth assembly hole 15 is centered around the through-hole 14 and evenly distributed outside the through-hole 14, so as to facilitate production and processing and meet subsequent assembling requirements. To maximize the safety and reliability of the vehicle, the wheel bearing 6 needs to be firmly connected to the steering knuckle. To meet the requirements in practical use, the number of the fourth assembly holes 15 is generally three or four. Specifically, FIG. 2 shows a steering knuckle assembled with a tie rod 3, a lower control arm 4, a lower leaf spring 7, and a wheel bearing 6. One end of the tie rod 3 is articulated to the first assembly hole 21 of the steering knuckle. The first junction of the lower control arm 4 is articulated to the second assembly hole 11. The two lower support arms of the lower control arm 4 are both connected to the lower leaf spring 7. A part of the wheel bearing 6 runs through the through-hole 14 and is connected to the bottom face of the housing 1 through the fourth assembly hole 15.

In addition, the steering knuckle needs to be assembled with a brake caliper. Therefore, a fifth assembly hole 16 configured to connect the brake caliper is further created on the housing 1 on a side opposite to the extension arm 2. Generally, the number of the fifth assembly holes 16 may be two, and the fifth assembly holes are distributed on an opposite side of the extension arm 2 along the length direction of the housing 1.

Understandably, the steering knuckles are usually disposed in pairs to fit a pair of rear wheels. The two steering knuckles in the pair are the same except for a mirror-symmetrical structure in relation to each other.

As shown in FIG. 3 and FIG. 4, a second aspect of this application provides a steering mechanism, including a tie rod 3, an upper control arm assembly 5, a lower control arm 4, a lower leaf spring 7, a damper 8, and the steering knuckle disclosed above. The number of steering knuckles is plural and matches the number and positions of rear wheels. Generally, a pair of steering knuckles is required when the steering mechanism includes a pair of rear wheels. The two steering knuckles in the pair are a mirror-symmetrical structure in relation to each other. When the number of pairs of rear wheels increases, the number of pairs of steering knuckles also increases proportionally.

The tie rod 3 is articulated between the first assembly holes 21 of two steering knuckles disposed opposite to each other. The extension arm 2 disposed here provides a greater distance for the articulation point between the two rear wheels in pairs, thereby increasing the space available for steering. In conjunction with the first assembly hole 21 disposed on the extension arm 2, an additional articulation point is provided for the tie rod 3, thereby increasing the degree of freedom of the tie rod 3 during the steering, and in turn, implementing a larger angle of steering.

The lower control arm 4 includes two lower support arms. A first junction exists between the two lower support arms. The first junction is articulated to the second assembly hole 11, and the two lower support arms are both connected to the lower leaf spring 7.

The structure of the upper control arm assembly 5 is similar to the structure of the lower control arm 4. The upper control arm assembly 5 includes two upper support arms. A second junction exists between the two upper support arms. The second junction is articulated to the third assembly hole 12. The two upper support arms are both connected to a rear subframe 9.

The damper 8 is connected between the rear subframe 9 and the lower leaf spring 7.

All the articulations are ball joint articulations.

In an embodiment, in a pair of rear wheels, for a rear wheel on one side, the steering tie rod 3 is passed through the first assembly hole 21 in the steering knuckle by ball-jointing. An end of the tie rod, at which the ball joint is located, is articulated to the tie rod 3. The other end of the tie rod is fixed by a bolt. Subsequently, the tie rod is passed through the second assembly hole 11 by ball-jointing, and articulated to the first junction of the lower control arm 4. The two lower support arms of the lower control arm 4 are bolted to the lower leaf spring 7. Similarly, the tie rod is passed through the third assembly hole 12 by using a ball pin, and is articulated to the second junction of the upper control arm assembly 5. The two upper support arms of the upper control arm assembly 5 are contiguous to two sides of the rear subframe 9. The upper end of the damper 8 is connected to the upper end of the rear subframe 9, and the lower end of the damper 8 is connected to the lower leaf spring 7 after being connected to a lower bracket of the damper 8, thereby implementing the assembling of the steering mechanism of the rear wheel on one side. The steering mechanism of the rear wheel on the other side is assembled in the same way.

The steering mechanism provided in this application achieves merits in addition to the beneficial effects of the steering knuckle described above. The steering knuckle in the steering mechanism is directly connected to the lower leaf spring 7 through the lower control arm 4, thereby replacing the conventional practice of combining the lower control arm 4 with a spring structure, reducing the unsprung mass of the suspension and improving the comfort and maneuverability of the leaf spring suspension.

The foregoing embodiments are merely intended for describing the technical solutions of this application, but not for limiting this application. Although this application is described in detail with reference to the foregoing embodiments, a person of ordinary skill in the art understands that modifications may still be made to the technical solutions described in the foregoing embodiments, or equivalent replacements may still be made to some or all technical features thereof, without departing from the scope of the technical solutions of the embodiments of this application.

What is claimed is:

1. A steering knuckle, comprising:
a housing; and
an extension arm;
wherein:
one end of the extension arm is disposed on the housing on a side corresponding to a position of a rear wheel, and a first assembly hole configured to fit a ball joint tie rod is created at another end of the extension arm; and
the housing comprises a bottom face as well as a first end face and a second end face disposed opposite to each other on the bottom face, a second assembly hole configured to fit a ball joint lower control arm is created on the first end face, a third assembly hole configured to fit a ball joint upper control arm assembly is created on the second end face, and a connecting line between the second assembly hole and the third assembly hole forms a kingpin axis.

2. The steering knuckle according to claim 1, wherein a gouge is created on the extension arm.

3. The steering knuckle according to claim 1, wherein the housing and the extension arm are formed in one piece.

4. The steering knuckle according to claim 3, wherein a reinforcing rib is disposed in the housing, one end of the reinforcing rib is connected to the bottom face of the housing, and another end of the reinforcing rib abuts on a lateral face of the housing.

5. The steering knuckle according to claim 4, wherein the reinforcing rib is located on the housing on a side close to the extension arm.

6. The steering knuckle according to claim 3, wherein a through-hole configured to allow passage of a wheel bearing is created on the bottom face of the housing, and a fourth assembly hole configured to connect the wheel bearing is further created outside the through-hole.

7. The steering knuckle according to claim 6, wherein the fourth assembly hole is one of at least one fourth assembly hole, and the at least one fourth assembly hole is centered around the through-hole and evenly distributed outside the through-hole.

8. The steering knuckle according to claim 1, wherein the housing is made of aluminum.

9. The steering knuckle according to claim 8, wherein a fifth assembly hole configured to connect a brake caliper is further created on the housing on a side opposite to the extension arm.

10. A steering mechanism, comprising:
a tie rod;
an upper control arm assembly;
a lower control arm;
a lower leaf spring;
a damper; and
at least one pair of steering knuckles disposed opposite to each other, each of the at least one pair of steering knuckles being the steering knuckle according to claim 1;
wherein:
the at least one pair of steering knuckles are configured to implement steering of a pair of coaxial rear wheels;
the tie rod is articulated between the first assembly holes of the two steering knuckles disposed opposite to each other;
the lower control arm comprises two lower support arms, a first junction exists between the two lower support arms, the first junction is articulated to the second assembly hole, and the two lower support arms are both connected to the lower leaf spring;
the upper control arm assembly comprises two upper support arms, a second junction exists between the two upper support arms, the second junction is articulated to the third assembly hole, and the two upper support arms are both connected to a rear subframe;
the damper is connected between the rear subframe and the lower leaf spring; and
all the articulations are ball joint articulations.

* * * * *